United States Patent
Sameda et al.

(10) Patent No.: US 8,224,882 B2
(45) Date of Patent: Jul. 17, 2012

(54) INDUSTRIAL CONTROLLER

(75) Inventors: Yoshito Sameda, Yokohama (JP);
Hiroshi Nakatani, Tama (JP); Akira Sawada, Kiyose (JP); Jun Takehara, Tokyo (JP); Hiroyuki Nishikawa, Iruma (JP); Motohiko Okabe, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1109 days.

(21) Appl. No.: 12/108,774

(22) Filed: Apr. 24, 2008

(65) Prior Publication Data
US 2008/0281896 A1 Nov. 13, 2008

(30) Foreign Application Priority Data
May 9, 2007 (JP) ................. P2007-125065

(51) Int. Cl.
*G06F 7/38* (2006.01)
(52) U.S. Cl. ........................................ 708/490
(58) Field of Classification Search ........... 708/490–492
See application file for complete search history.

(56) References Cited

U.S. PATENT DOCUMENTS

| | | | | |
|---|---|---|---|---|
| 4,949,294 A | * | 8/1990 | Wambergue | 708/491 |
| 5,117,383 A | * | 5/1992 | Fujita et al. | 708/491 |
| 5,887,006 A | * | 3/1999 | Sharma | 714/784 |
| 7,774,689 B2 | * | 8/2010 | Chiu et al. | 714/786 |
| 2007/0147232 A1 | | 6/2007 | Takehara et al. | |

FOREIGN PATENT DOCUMENTS

| | | |
|---|---|---|
| JP | 2665113 | 6/1997 |
| JP | 2006-228121 | 8/2006 |

OTHER PUBLICATIONS

The Patent Office of the People's Republic of China, Notification of the First Office Action, dated Jan. 22, 2010.*
Akio Fukuhara et al., Corona Ltd., "Sanzyutsu Fugou Riron (arithmetic code theory)", Japan, Apr. 1978, pp. 32-72, and 97-181.
U.S. Appl. No. 12/141,365, filed Jun. 18, 2008, Nakatani et al.

* cited by examiner

*Primary Examiner* — Tan Mai
(74) *Attorney, Agent, or Firm* — Oblon, Spivak, McClelland, Maier & Neustadt, L.L.P.

(57) ABSTRACT

A first arithmetic operator (11) includes a first modular arithmetic coding encoder (11b) for encoding a numeric data transmitted by a command from a central controller (31) into a modular arithmetic code, a first arithmetic operation processor (11a) using the numeric data as modular arithmetic coded as an input operand, for executing an arithmetic operation based on a command from the central controller (13), to provide an output in the form of a modular arithmetic code, and a first modular arithmetic code decoder (11c) for determining presence or absence of a bit error in the numeric data output from the first arithmetic operation processor, correcting the bit error, if detected any, to output a decoded numeric data.

5 Claims, 8 Drawing Sheets

FIG. 8

| NUMERIC DATA | MODULAR ARITHMETIC CODES |
|---:|---:|
| 0 | 0 |
| 1 | 47 |
| 2 | 94 |
| 3 | 141 |
| 4 | 188 |
| 5 | 235 |
| 6 | 282 |
| 7 | 329 |
| 8 | 378 |
| 9 | 423 |
| 10 | 470 |
| 11 | 517 |
| 12 | 564 |
| 13 | 611 |
| 14 | 658 |
| ... | ... |

FIG. 9

| SYNDROMES | ERROR POSITIONS | |
|---|---|---|
| 1 | 0 | E+ |
| 2 | 1 | E+ |
| 3 | 19 | E+ |
| 4 | 2 | E+ |
| 5 | 9 | E- |
| 6 | 20 | E+ |
| 7 | 12 | E+ |
| 8 | 3 | E+ |
| 9 | 15 | E+ |
| 10 | 10 | E- |
| 11 | 17 | E- |
| 12 | 21 | E+ |
| 13 | 7 | E- |
| 14 | 13 | E+ |
| 15 | 5 | E- |
| 16 | 4 | E+ |
| 17 | 6 | E+ |
| 18 | 16 | E+ |
| 19 | 14 | E- |
| 20 | 11 | E- |
| 21 | 8 | E+ |
| 22 | 18 | E- |
| 23 | 22 | E- |
| 24 | 22 | E+ |
| 25 | 18 | E+ |
| 26 | 8 | E- |
| 27 | 11 | E+ |
| 28 | 14 | E+ |
| 29 | 16 | E- |
| 30 | 6 | E- |
| 31 | 4 | E- |
| 32 | 5 | E+ |
| 33 | 13 | E- |
| 34 | 7 | E+ |
| 35 | 21 | E- |
| 36 | 17 | E+ |
| 37 | 10 | E+ |
| 38 | 15 | E- |
| 39 | 3 | E- |
| 40 | 12 | E- |
| 41 | 20 | E- |
| 42 | 9 | E+ |
| 43 | 2 | E- |
| 44 | 19 | E- |
| 45 | 1 | E- |
| 46 | 0 | E- |

INDUSTRIAL CONTROLLER

BACKGROUND OF THE INVENTION

1. Field of the Invention

The present invention relates to an industrial controller, and addressees in particular to a fault-tolerant technique for numeric data to be processed by operation.

2. Description of the Related Art

For control in a social infrastructure, industrial controllers in use are mostly employed for a 24-hour service as a given. Such industrial controllers are employed in those systems requiring operation processes to be error-free during their services. There is thus growing role of a fault-tolerant system allowing normal processes to be continued as a whole, even with a trouble caused in part.

Such the background is based on for development of a code theory (non-patent document 1), as well as for introduction of a fault-tolerant technique using an error correcting code, primarily in a storage system, such as a memory as a main (patent document 1). Referred now as the non-patent document 1 is "Sanzyutsu Fugou Riron (arithmetic code theory) by Akio Fukuhara and Munehiro Gotoh, Corona Ltd., Japan, April 1978, pp 32-72, pp 97-181", and the patent document 1 is Japanese Patent Publication No. 2,665,113.

For the storage system, implementation of a fault-tolerant technique is unavoidable because of, among others, (1) the number of elements very greater than operation circuitry, and (2) the factor of availability higher than operation circuitry. Referred now as operation circuitry is circuitry composed of operation circuits for arithmetic operations, such as addition and subtraction as well as multiplication and division, and their control circuits.

On the contrary, for operation circuitry, implementing a fault-tolerant technique has not been deemed so important, for reasons such as (1) a smaller element number, (2) a lower availability factor, and (3) a greater implementation cost than the storage system.

In the field of a semiconductor process technique, however, as replies to demands for higher densification and higher speeds, recent years have observed developments of a finer fabrication of logic circuit, accompanied by an increasing difficulty in designing a robust circuit with a sufficient margin ensured as in the past.

This induces a software error due to fine particles in logic circuit.

Really, such a development of finer fabrication of circuit is accompanied by an increasing probability in occurrence of a software error due to fine particles, even in operation circuitry of an industrial controller or the like.

On the other hand, for those systems to be provided with a higher reliability as necessary to meet demands for an increase in operation speed and an increase in amount to be processed by operation, attempts are positively made for parallelization of operation circuitry.

In this respect, recently known is an operation processor provided with a plurality of operators for logic operations to be performed as desirable to one or more input operands, and configured to separate from the system such an operator as high of defective fraction, causing another operator to re-execute an operation process having been assigned to that operator, allowing even for an ensured security without damages to functions of the system (patent document 2). Referred now as the patent document 2 is Japanese Patent Application Laying-Open Publication No. 2006-228,121.

SUMMARY OF THE INVENTION

However, for such a fault-tolerant technique using an error correcting code as disclosed in the patent document 1, the application to an industrial controller may afford a detection and correction of bit errors such as in logic operations excepting arithmetic operations, but have a difficulty of detection and correction of bit errors in arithmetic operations.

On the other hand, such a fault-tolerant system as disclosed in the patent document 2 should in other words be a redundant system with multiplied operators, having a plurality of operators prepared, comparing a code acquired by a coding before logic operation with a code acquired by a coding after logic operation, detecting a defective operation by a match/mismatch in between, and separating from the system an operator or operators greater in number of defect occurrences than a prescribed frequency. A resultant increase in number of operators may cause not simply an increased probability of error occurrences, but also a complicated configuration.

Further, it may constitute a difficulty to cope with a demand for a temporary bit error to be corrected every operation, by a correction process to be responsive within a prescribed control period, as in an industrial controller.

The present invention has been devised to solve such an issue, and it's an object of the invention to provide an industrial controller allowing a bit error in operation of a numeric data to be detected and corrected in real time for each operation command, with a simple configuration.

According to an aspect of the invention, an industrial controller comprises a memory configured to store therein a control program for the industrial controller and control parameters including parameters of a modular arithmetic coding and parameters of an arithmetic operation as a given numerical data, an input interface configured to have a numeric data input, an arithmetic operator comprising a modular arithmetic coding encoder configured for the modular arithmetic coding to encode the input numeric data and the given numerical data into a modular arithmetic code, an arithmetic operation processor configured for a process of applying the arithmetic operation to the modular arithmetic code to provide a processed modular arithmetic code, and a modular arithmetic code decoder configured to detect in real time a bit error from the processed modular arithmetic code, and correct in real time the detected bit error to provide a corrected numeric data, an output interface configured to output the corrected numeric data, and a central controller configured to have the arithmetic operator execute the arithmetic operation based on the control program using the control parameters.

According to another aspect of the invention, an industrial controller comprises a memory section configured to store therein a control program for the industrial controller and control parameters including parameters of a modular arithmetic coding and parameters of an arithmetic operation as a given numerical data, an input interface comprising a modular arithmetic coding encoder configured for the modular arithmetic coding to encode an input numeric data into a first modular arithmetic code, an arithmetic operator configured for the arithmetic operation of the first modular arithmetic code and a second modular arithmetic code into which the given numerical data is encoded to provide an operated modular arithmetic code, an output interface comprising a first modular arithmetic code decoder configured to detect in real time a bit error from the operated modular arithmetic code, and correct in real time the detected bit error to provide a first corrected numeric data, and a central controller configured to have the arithmetic operator execute the arithmetic operation based on the control program using the control parameters, and the memory section comprises a second modular arithmetic code decoder configured to decode a modular arithmetic code of an address data designated by the central controller, and a memory configured to store therein a modular arithmetic code of the control parameters.

BRIEF DESCRIPTION OF THE DRAWINGS

FIG. 8 is a table listing an exemplary set of modular arithmetic codes for the industrial controller of FIG. 1.

FIG. 9 is an exemplary syndrome table for the industrial controller of FIG. 1.

DETAILED DESCRIPTION OF THE PREFERRED EMBODIMENTS

There will be described below into details the preferred embodiments of the present invention, with reference to the accompanying drawings.

First Embodiment

Description is now made of an industrial controller according to a first embodiment of the invention, with reference to FIG. 1 to FIG. 9.

Figure 1:
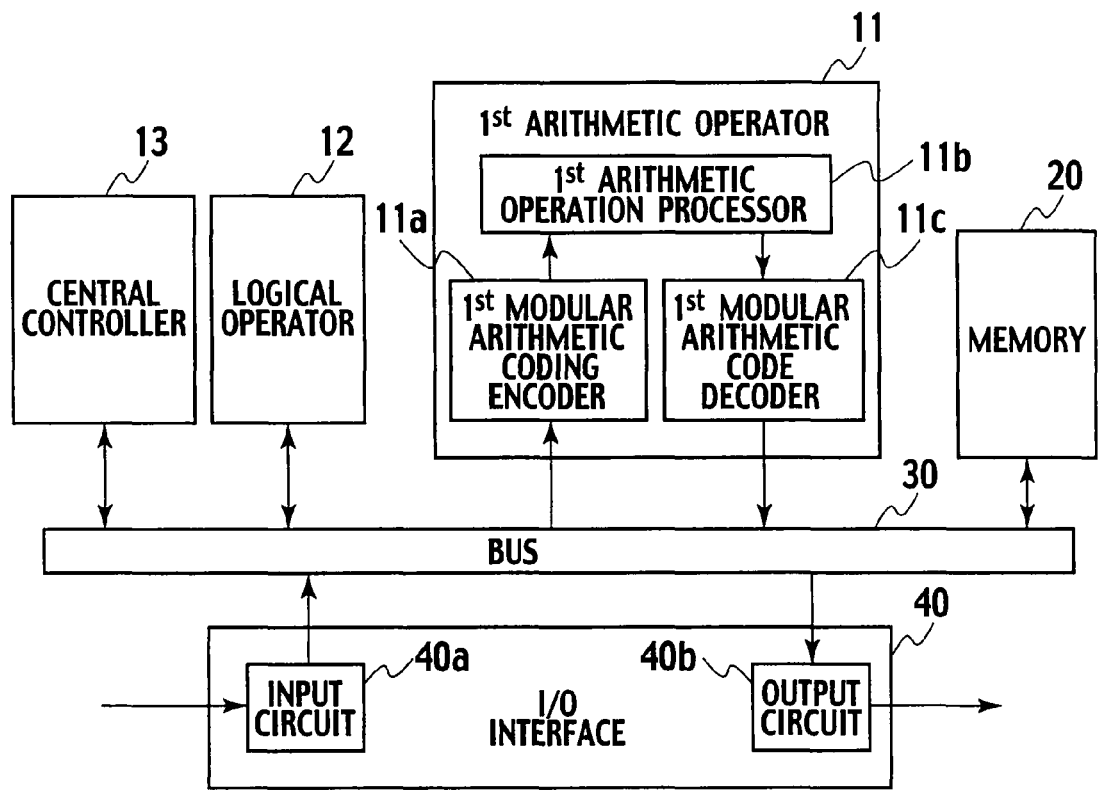
FIG. 1 is a block diagram of an industrial controller according to a first embodiment of the present invention.

FIG. 1 illustrates a configuration of the industrial controller according to the first embodiment. This industrial controller is configured with: a first arithmetic operator 11 for an arithmetic operation of numeric data; a logical operator 12 for a logical operation of logical data; a memory 20 for storing therein a control program for control of processes and the like to be controlled; an I (input)/O (output) interface 40 composed of an input circuit 40a as an input interface for signals to be input, such as an input signal from a sensor for detecting a condition of a target to be controlled, and an output circuit 40b as an output interface for signals to be output, such as an output signal to an actuator for controlling a target to be controlled; a central controller 13 adapted to follow the control program to take in an input data from the input circuit 40a, give command of prescribed operation to the first arithmetic operator 11 and the logical operator 12, and have the output circuit 40b output a data to be output after an associated operation process; and a bus 30 for their interconnections.

The first arithmetic operator 11, logical operator 12, and central controller 13 may constitute a combination called "CPU (central processing unit)".

For industrial controller, data to be processed by operations therein are categorized between a numeric data and a logical data. The numeric data is input via an ADC (analog to digital conversion) circuit for a digital conversion of an analog signal such as from e.g. a temperature sensor, while the logical data is input via e.g. a digital circuit such as for an alarm signal.

The numeric data and the logical data are given as input operands of the first arithmetic operator 11 and the logical operator 12, respectively, to be processed by operations in accordance with commands from the central controller 13.

FIG. 2 to FIG. 7 show illustrative configurations the first arithmetic operator 11 has or may have for execution of operations of numeric data. The first arithmetic operator 11 includes: a first modular arithmetic coding encoder 11a configured to encode, by a binary cyclic AN code, an operand input thereto via the bus 30; a first arithmetic operation processor 11b configured for an operation of an arithmetic data encoded (as a modular arithmetic code) in accordance with an arithmetic command given from the central controller 13; and a first modular arithmetic code decoder 11c configured to convert an output of the operation of the first arithmetic operation processor 11b into a numeric data, while determining presence or absence of a bit error in the output as a modular arithmetic code, and correcting the determined error bit, and output a corrected numeric data thus decoded.

Description is now made into details of parts of the first arithmetic operator 11. AN code means a set of products AN of a specific natural number A called 'generator' and information numbers as integral numbers N to be coded, that is referred to 'codeword'. Codeword in binary notation is referred to 'binary AN code'. Further, when closed under binary permutation, the binary AN code is referred to 'binary cyclic AN code'. This code allows selection of an optimum code due to the ability of bit error correction, in accordance with information being processed (e.g., non-patent document 1, p. 238, appendix B, exemplary optimum codes).

Suppose a set of parameters of a binary cyclic AN code, such that:

generator A=47 (A=101111 in binary notation: 6 bits);
length of information number N=17 bits;
code length n=23 bits; and
inter-code minimum modular arithmetic distance=3,
which will be described.

Figure 2:
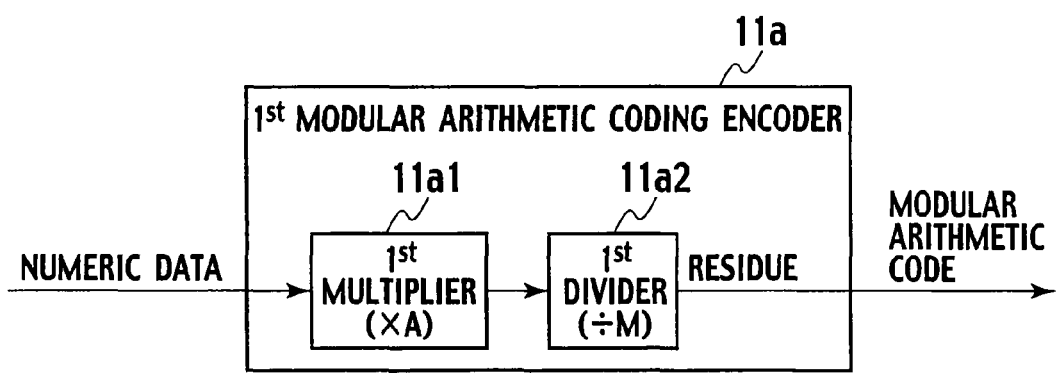
FIG. 2 is a block diagram of a modular arithmetic coding encoder of the industrial controller of FIG. 1.

In this case, as illustrated in FIG. 2, the first modular arithmetic coding encoder 11a to be configured for an encoding of a numeric data (N) given as an input operand, is made up by: a first multiplier 11a1 for multiplying the input numeric data by the generator A; and a first divider 11a2 for dividing an output of the first multiplier 11a1 by a modulus M ($=2^{23}-1$).

Figure 3:
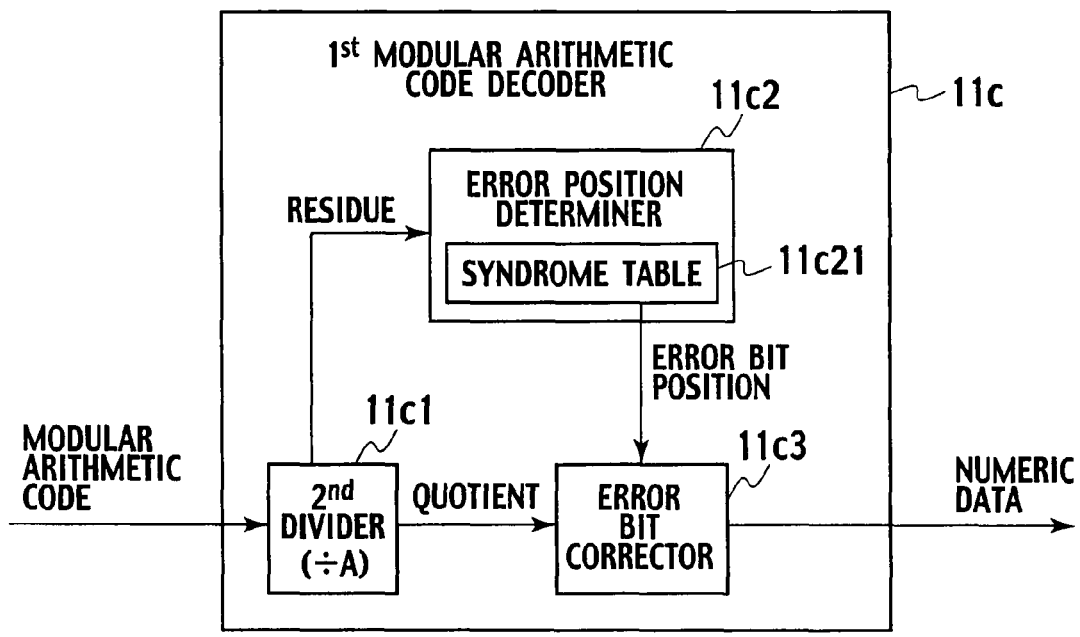
FIG. 3 is a block diagram of a modular arithmetic code decoder of the industrial controller of FIG. 1.

Further, as illustrated in FIG. 3, the first modular arithmetic code decoder 11c is made up by: a second divider 11c1 for receiving a signal output in modular arithmetic code after the operation of the first arithmetic operation processor 11b, and dividing the same by the generator A to determine a quotient and a residue (as a syndrome); an error position determiner 11c2 for referring to a syndrome table stored in advance to determine, from the syndrome, presence or absence of an error bit in the quotient and a position of the error bit; and an error bit corrector 11c3 for correcting a bit signal in the error bit position determined by the error bit position determiner, and outputting a corrected numeric data.

Figure 4:
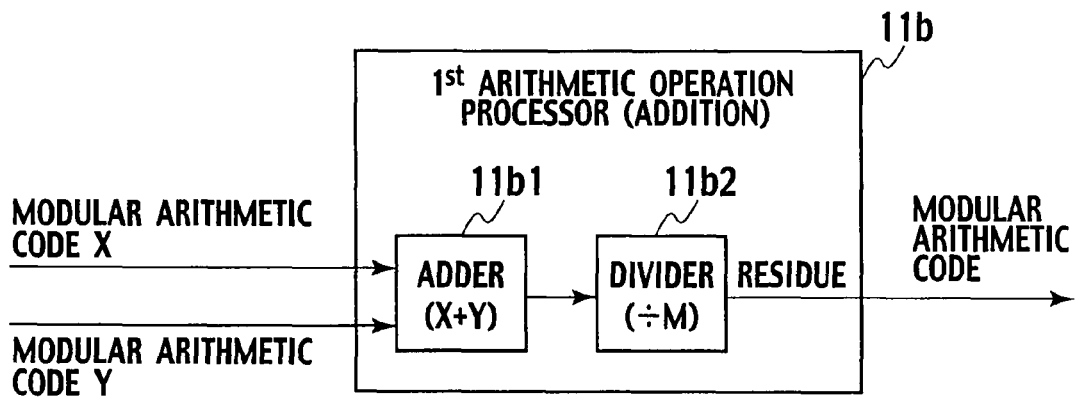
FIG. 4 is a block diagram of a modular arithmetic operation processor for addition of the industrial controller of FIG. 1.

Description is now made of exemplary configurations of the first arithmetic operation processor 11b by commands for arithmetic operations of input operands. First, for an arithmetic command of addition from the central controller 13, as illustrated in FIG. 4, the first arithmetic operation processor 11b is made up by: an adder 11b1 for an addition of an input operand X and an input operand Y; and a divider 11b2 for a division of an output of the adder 11b1 by the modulus M.

Figure 5:
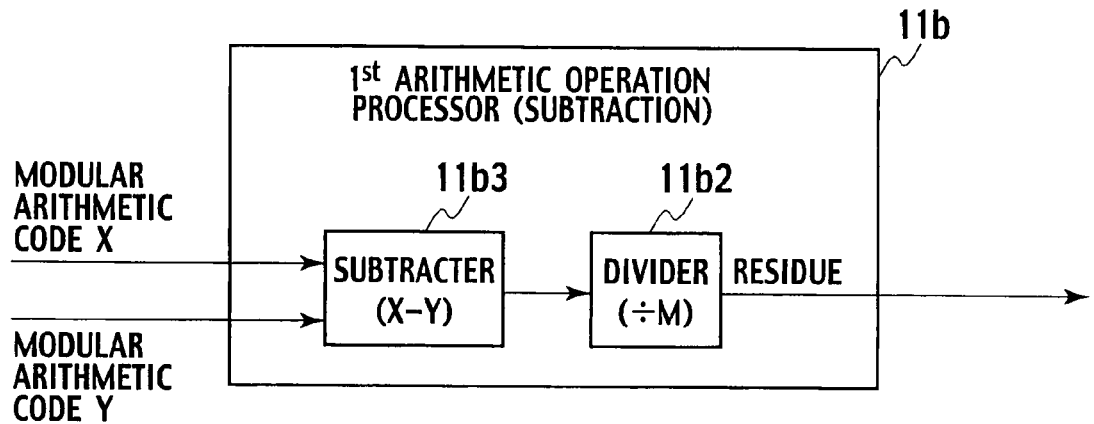
FIG. 5 is a block diagram of a modular arithmetic operation processor for subtraction of the industrial controller of FIG. 1.

For an arithmetic command of subtraction, as illustrated in FIG. 5, the first arithmetic operation processor 11b is made up by: a subtracter 11b3 for a subtraction of an input operand Y from an input operand X; and a divider 11b2 for a division of an output of the subtracter 11b3 by the modulus M.

Figure 6:
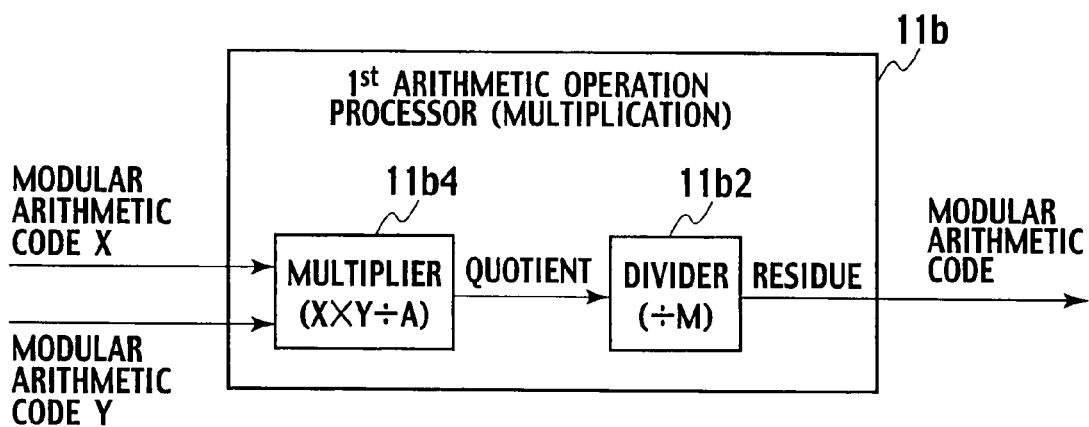
FIG. 6 is a block diagram of a modular arithmetic operation processor for multiplication of the industrial controller of FIG. 1.

For an arithmetic command of multiplication, as illustrated in FIG. 6, the first arithmetic operation processor 11b is made up by: a multiplier 11b4 for a multiplication of an input operand X and an input operand Y, followed by a division by the generator A; and a divider 11b2 for a division of an output of the multiplier 11b4 by the modulus M.

Figure 7:
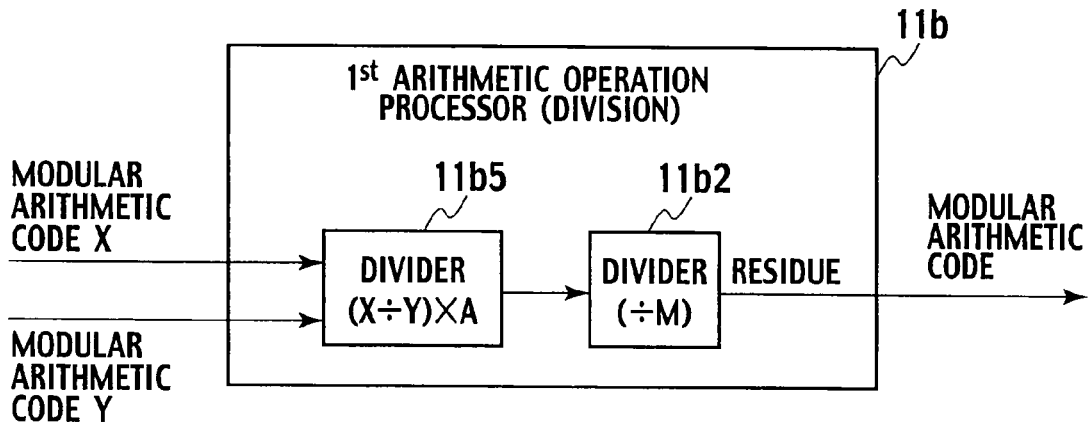
FIG. 7 is a block diagram of a modular arithmetic operation processor for division of the industrial controller of FIG. 1.

For an arithmetic command of division, as illustrated in FIG. 7, the first arithmetic operation processor 11b is made up by: a divider 11b5 for a division of an input operand X by an input operand Y, followed by a division by the generator A; and a divider 11b2 for a division of an output of the divider 11b5 by the modulus M.

Description is now made, with reference to FIG. 8 and FIG. 9, of actions of bit error correction in an operation of the first arithmetic operator 11, taking the arithmetic command of addition as an example given numeric data of input operands, such that X=2 and Y=3.

First, two input operands X=2 and Y=3 are multiplied respectively by a generator A=47 at the first modular arithmetic coding encoder 11a, and thereafter, divided respectively by a modulus $M=2^{23}-1$ at the first divider 11a2, whereby numeric data "94" and "141" are output.

And, addition of the numeric data "94" and "141" is executed at the first arithmetic operation processor 11b. As a result, absent a bit error, there is output a numeric data "235". In binary notation, this operation is: 00000000000000001011110+0000000000000010001101=000000000000000011101011

Then, at the second divider 11c1 of the first modular arithmetic code decoder 11c, the numeric data "235" is divided by the generator A=47, resulting in a quotient "5" with a residue "0". In this case, that is, for no error bit position informed from the error bit position determiner 11c2, the numeric data "5" is output from the error bit corrector 11c3.

However, in a case of occurrence of one bit error in way of the operation above, given "171" (00000000000000010101011 in binary notation) as a result of the addition of numeric data "94" and "141", the numeric data "171" is divided by the generator A=47 at the second divider 11c1 of the first modular arithmetic code decoder 11c, outputting a quotient "3" and a residue "30". And, the error bit position determiner 11c2 determines, from a syndrome table 11c21 shown in FIG. 9, an error bit position of the quotient to be "6" corresponding to a syndrome "30". Further, it is determined that the error is E−, i.e., the bit of the error position should be 0. For E+, the bit of error position is to be determined "1".

The above-noted result is informed to the error bit corrector 11c3, where the value of a seventh bit corresponding to the error bit position "6" of the quotient is rewritten from 0 to 1, to output a corrected numeric data.

As will be seen from the foregoing description, in the present embodiment, where a binary cyclic AN code is used, it is allowed to implement, in real time per arithmetic operation command, both detection and correction of an error of numeric data by a value of syndrome when decoding a modular arithmetic code.

According to the present embodiment, in a sense, an industrial controller comprises an input interface 40a configured to have a numeric data input, an arithmetic operator 11 comprising a modular arithmetic coding encoder 11a configured for a modular arithmetic coding to encode the input numeric data into a modular arithmetic code, an arithmetic operation processor 11b configured for a process of applying an arithmetic operation to the modular arithmetic code to provide a processed modular arithmetic code, and a modular arithmetic code decoder 11c configured to detect in real time a bit error from the processed modular arithmetic code, and correct in real time the detected bit error to provide a corrected numeric data, an output interface 40b configured to output the corrected numeric data, a memory 20 configured to store therein a control program and parameters of the modular arithmetic coding, and a central controller 13 configured to have the arithmetic operator execute the arithmetic operation based on the control program using the parameters. The modular arithmetic coding encoder 11a comprises a multiplier 11a1 configured for a multiplication of the input numeric data by a predetermined generator of a binary cyclic AN code to provide a multiplied numeric data, and a first divider 11a2 configured for a division of the multiplied numeric data by a predetermined modulus corresponding to the generator to provide the modular arithmetic code, and the modular arithmetic code decoder 11c comprises a second divider 11c1 configured for a division of the processed modular arithmetic code by the generator to determine a quotient and a residue, an error position determiner 11c2 configured for a reference to a stored syndrome table to determine an error bit position from the residue, and an error bit corrector 11c3 configured for a correction of an error bit of the quotient corresponding to the error bit position to provide the corrected numeric data.

Further, in a sense, an industrial controller comprises an arithmetic operator 11 configured for combination of an encoding of numeric data to be arithmetically operated and a decoding of data after an arithmetic operation to correct an error bit, a logical operator 12 configured for a logical operation of logical data, a memory section 20 configured for storage of a control program and a set of operation parameters to be stored in advance, an I/O interface 40 configured to input the numeric data and the logical data, and output numeric data after the numeric operation and logical data after the logical operation, a central controller 13 configured to output prescribed commands to the arithmetic operator and the logical operator for execution of the control program, and a bus 30 configured for interconnections therebetween, and the arithmetic operator 11 comprises a modular arithmetic coding encoder 11a configured to encode a numeric data transmitted thereto by a command output from the central controller into a modular arithmetic code, an arithmetic operation processor 11b configured to execute an operation of an encoded numeric data as an input operand in accordance with a command from the central controller to provide an output as a modular arithmetic code, and a modular arithmetic code decoder 11c configured for combination of a determination of presence or absence of a bit error in data of the output of the arithmetic operation processor, and a correction of a detected bit error, if detected any, to output a decoded numeric data, whereby a bit error generated in the arithmetic operator is correctable in a course of operation. The modular arithmetic coding encoder 11a comprises a multiplier 11a1 configured for a multiplication of numeric data by a predetermined generator of a binary cyclic AN code, and a first divider 11a2 configured for a division of an output of the multiplication by a predetermined modulus corresponding to the generator of the binary cyclic AN code, and the modular arithmetic code decoder 11c comprises a second divider 11c1 configured for a division of the output of the arithmetic operation processor by the generator to determine a quotient and a residue as a syndrome, an error position determiner 11c2 configured for a reference to be made for a detected residue in an output of the second divider to a syndrome table stored in advance to determine an error bit position, and an error bit corrector 11c3 configured to correct an error bit of the quotient in accordance with an error bit position output of the error bit position determiner to provide an output as a numeric data.

Second Embodiment

Figure 10:
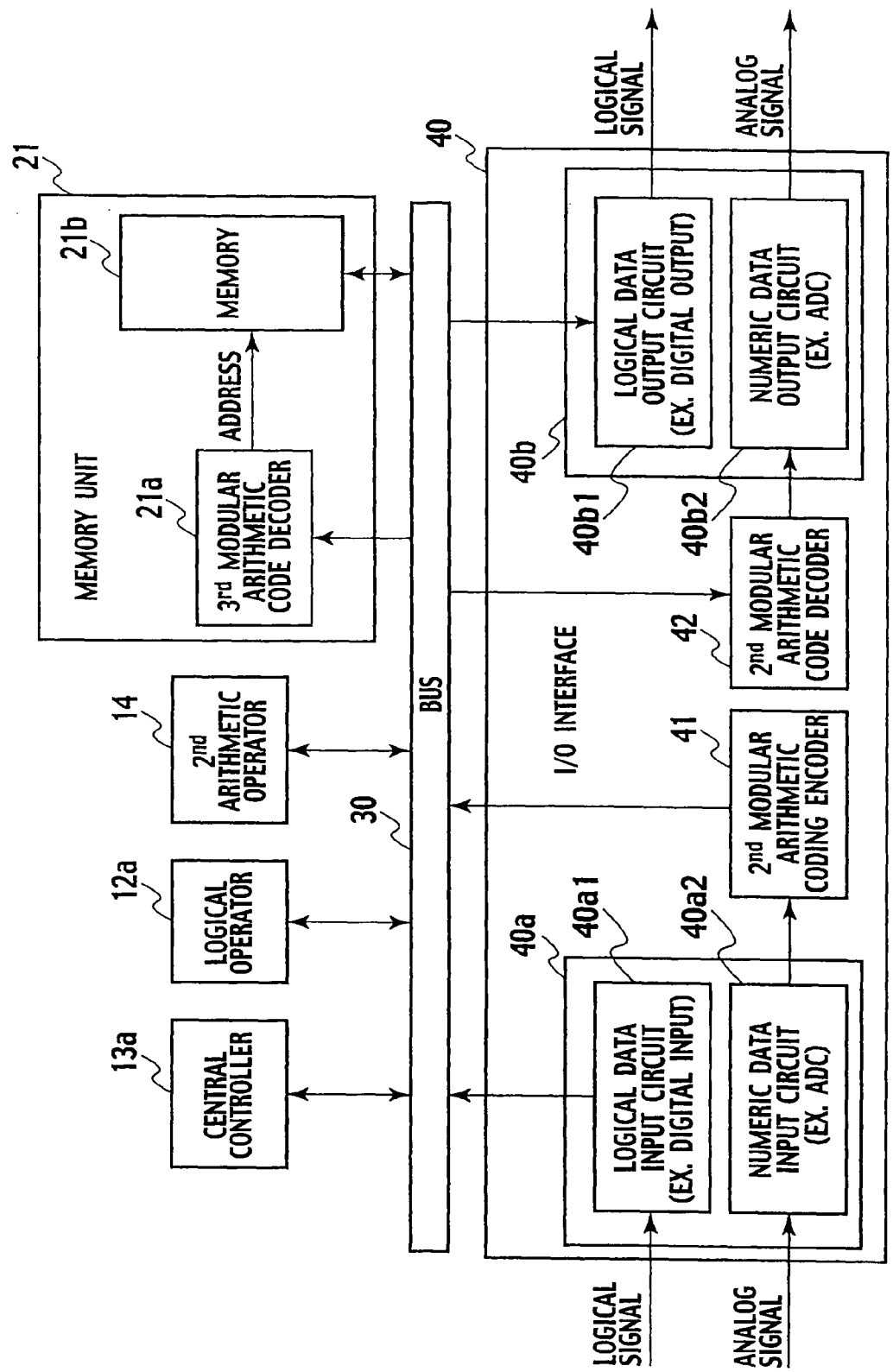
FIG. 10 is a block diagram of an industrial controller according to a second embodiment of the present invention.

Description is now made of an industrial controller according to a second embodiment of the present invention, with reference to FIG. 10. For the second embodiment illustrated in FIG. 10, like parts to the first embodiment are designated by like reference characters, to eliminate redundant description.

The present embodiment is different from the first embodiment in that the latter decodes a numeric data into a modular arithmetic code at the first arithmetic operator 11, and determines a bit error from a value of syndrome of the numeric data in modular arithmetic code after arithmetic operation, to correct the bit error, while in the former, among input data input to an I/O interface 40, numeric data have modular arithmetic codes generated thereto, so numeric data to be received through a bus 30 are all given as a modular arithmetic code, and numeric data to be output from the I/O interface 40 undergo a decoding process of modular arithmetic code, where bit errors of numeric data are corrected.

The I/O interface 40 has an input interface and an output interface. The input interface includes: a logical data input circuit 40a1; a numeric data input circuit 40a2, which has an ADC for a conversion of analog signal to digital signal; and a second modular arithmetic coding encoder 41, whereby numeric data digitalized at the input circuit 40a2 are encoded into modular arithmetic codes to be output.

The output interface includes: an output circuit 40b, which is made up by a logical data output circuit 40b1 and a numeric data output circuit 40b2; and a second modular arithmetic code decoder 42, which is configured to receive a modular arithmetic coded numeric data output through the bus 30, determine a quotient and a residue (syndrome), determine from a value of the syndrome a bit error and an occurrence position thereof, correct the bit error if any, and output a corrected numeric data.

The second modular arithmetic coding encoder 41 has an identical configuration to the first modular arithmetic coding encoder lib, and the second modular arithmetic code decoder 42 has an identical configuration to the first modular arithmetic code decoder 11c.

A central controller 13 as well as a second arithmetic operator 14 is configured to process all associated numeric data as a modular arithmetic code.

Further, a memory 21 is made up as a section having: a memory 21b configured to store therein numeric data as modular arithmetic codes, including those which have not passed through the numeric data input circuit 40a2; and a third modular arithmetic code decoder 21a configured for a decoding to address signal with respect to address data of commands transmitted from the central controller 13a and modular arithmetic coded.

Accordingly, the present embodiment allows correction to be made at the I/O interface 40, not simply of bit errors of numeric data in arithmetic operation, but also of bit errors of numeric data due to path errors or the like.

According to the present embodiment, in a sense, an industrial controller comprises an input interface 40a comprising a modular arithmetic coding encoder 41 configured for a modular arithmetic coding to encode an input numeric data into a modular arithmetic code, an arithmetic operator 14 configured for an arithmetic operation of the modular arithmetic code to provide an operated modular arithmetic code, an output interface 40b comprising a first modular arithmetic code decoder 42 configured to detect in real time a bit error from the operated modular arithmetic code, and correct in real time the detected bit error to provide a first corrected numeric data, a memory section 21 configured to store therein a control program and parameters of the modular arithmetic coding, and a central controller 13a configured to have the arithmetic operator execute the arithmetic operation based on the control program using the parameters, and the memory section 21 comprises a second modular arithmetic code decoder 21a configured to decode a modular arithmetic code of an address data designated by the central controller, and a memory 21b configured to store therein a modular arithmetic code of the parameters. The modular arithmetic coding encoder 41 comprises a multiplier 11a configured for a multiplication of the input numeric data by a predetermined generator of a binary cyclic AN code to provide a multiplied numeric data, and a first divider 11a2 configured for a division of the multiplied numeric data by a predetermined modulus corresponding to the generator to provide the modular arithmetic code, and the first modular arithmetic code decoder 42 comprises a second divider 11c1 configured for a division of the operated modular arithmetic code by the generator to determine a first quotient and a first residue, an error position determiner 11c2 configured for a reference to a stored syndrome table to determine a first error bit position from the first residue, and an error bit corrector 11c3 configured for a correction of an error bit of the first quotient corresponding to the first error bit position to provide the first corrected numeric data.

Further, in a sense, an industrial controller comprises an arithmetic operator 14 configured for an arithmetic operation of a numeric data encoded as a modular arithmetic code, a logical operator 12a configured for a logical operation of logical data, a memory section 21 configured for storage of a control program and a set of operation parameters to be stored in advance, an I/O interface 40 configured to input numeric data and logical data, and output numeric data after the numeric operation and logical data after the logical operation, a central controller 13a configured to output prescribed commands to the arithmetic operator and the logical operator for execution of the control program with discrimination of logical data and modular arithmetic coded numeric data, and a bus 30 configured for interconnections therebetween, the I/O interface 40 comprises a modular arithmetic coding encoder 41 configured to encode numeric data included in data input, a first modular arithmetic code decoder 42 configured for combination of a decoding of a numeric data included in data output, a determination of presence or absence of a bit error, and a correction of a detected bit error, if detected any, to output a decoded numeric data, and the memory section 21 comprises a memory 21b configured to store therein as a modular arithmetic code a respective numeric data to be operation processed within the industrial controller, and a second modular arithmetic code decoder 21a configured to provide in a decoded form a coded address data designated by the central controller, whereby a respective one of numeric data encoded at the I/O interface 40 and residing in the industrial controller is allowed to be processed as a modular arithmetic code, and decoded at the I/O interface 40, to be output with a bit error corrected, if any. The modular arithmetic coding encoder 41 comprises a multiplier 11a1 configured for a multiplication of the numeric data included in the data input by a predetermined generator of a binary cyclic AN code, and a first divider 11a2 configured for a division of an output of the multiplication by a predetermined modulus corresponding to the generator of the binary cyclic AN code, and the first modular arithmetic code decoder 42 comprises a second divider 11c1 configured for a division of the numeric data included in the data output by the generator to determine a first quotient and a first residue as a syndrome, an error position determiner 11c2 configured for a reference to a syndrome table stored in advance to determine an error bit position for the first residue detected in an output of the second divider, and an error bit corrector 11c3 configured to correct an error bit of the first quotient corresponding to an error bit position output of the error position determiner, for an output as a numeric data.

Third Embodiment

Figure 11:
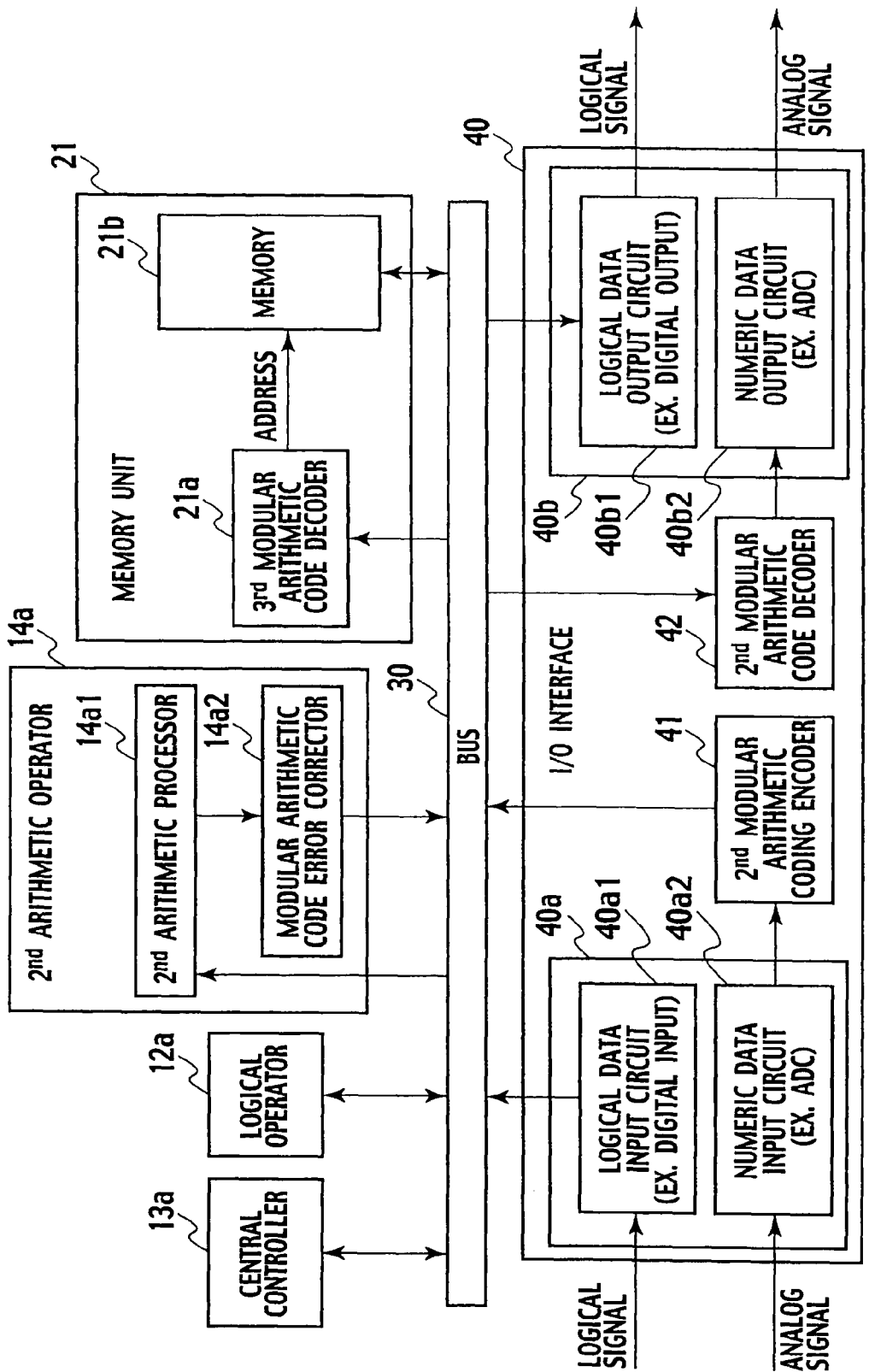
FIG. 11 is a block diagram of an industrial controller according to a third embodiment of the present invention.
Figure 12:
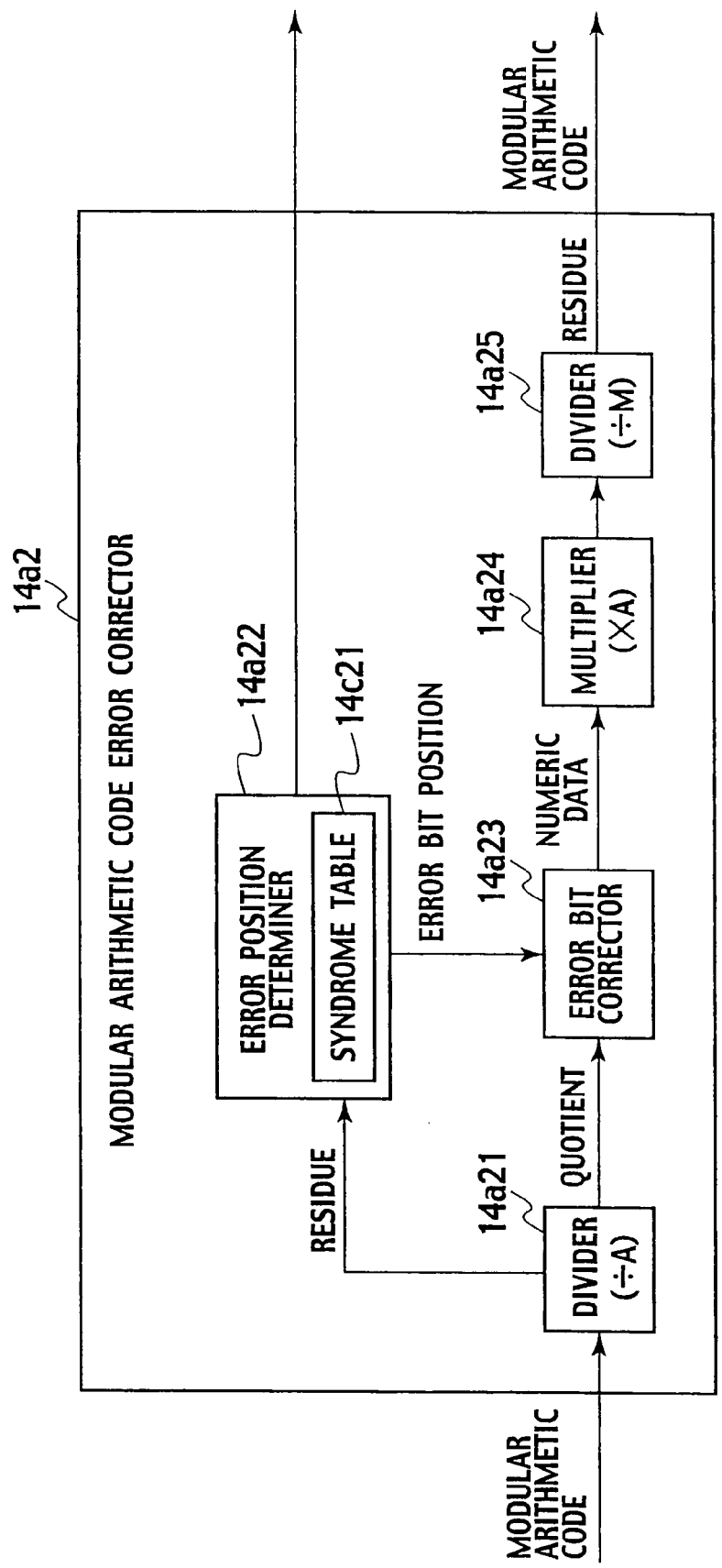
FIG. 12 is a block diagram of a modular arithmetic code error corrector of the industrial controller of FIG. 11.

Description is now made of an industrial controller according to a third embodiment of the present invention, with reference to FIG. 11 and FIG. 12. For the third embodiment illustrated in FIG. 11 and FIG. 12, like parts to the second embodiment are designated by like reference characters, to eliminate redundant description.

The present embodiment is different from the second embodiment in that the latter is configured to generate a modular arithmetic code for numeric data input to the I/O interface 40, have numeric data to be received through the bus 30 all modular arithmetic coded, and apply a decoding process to modular arithmetic coded numeric data to be output from the I/O interface 40, to make correction of errors in numeric data, while the former includes a second arithmetic operator 14a that additionally has a second arithmetic operation processor 14a1 configured for arithmetic operations of modular arithmetic coded numeric data, and a modular arithmetic code error corrector 14a2 configured for bit error correction of numeric data after arithmetic operations.

Description is now made of configuration of the modular arithmetic code error corrector 14a2, with reference to FIG. 12.

The modular arithmetic code error corrector 14a2 includes: a divider 14a21 for receiving a modular arithmetic coded numeric data output from the second arithmetic operation processor 14a1, and dividing the same by a generator A to output a quotient and a residue (as a syndrome); an error position determiner 14a22 for referring to a syndrome table to determine, from a value of the syndrome, presence or absence of an error bit and a position of the error bit; an error bit corrector 14a23 for correcting the error bit, if any, in the quotient to be output; a multiplier 14a24 for multiplying a corrected numeric data by the generator A; and a divider 14a25 for dividing the same by a modulus M to provide a modular arithmetic code.

Accordingly, the present embodiment allows not simply collective correction of, among others, bit errors in operation of the second arithmetic operator 14a and bit errors of numeric data due to path errors, but also discrimination of an error of numeric data, whether it is caused in the arithmetic operator 14a or elsewhere.

According to the present embodiment, in a sense, an industrial controller comprises an input interface 40a comprising a modular arithmetic coding encoder 41 configured for a modular arithmetic coding to encode an input numeric data into a modular arithmetic code, an arithmetic operator 14a configured for an arithmetic operation of the modular arithmetic code to provide an operated modular arithmetic code, an output interface 40b comprising a first modular arithmetic code decoder 42 configured to detect in real time a bit error from the operated modular arithmetic code, and correct in real time the detected bit error to provide a first corrected numeric data, a memory section 21 configured to store therein a control program and parameters of the modular arithmetic coding, and a central controller 13a configured to have the arithmetic operator execute the arithmetic operation based on the control program using the parameters, and the memory section 21 comprises a second modular arithmetic code decoder 21a configured to decode a modular arithmetic code of an address data designated by the central controller, and a memory 21b configured to store therein a modular arithmetic code of the parameters. The modular arithmetic coding encoder 41 comprises a multiplier 11a configured for a multiplication of the input numeric data by a predetermined generator of a binary cyclic AN code to provide a multiplied numeric data, and a first divider 11a2 configured for a division of the multiplied numeric data by a predetermined modulus corresponding to the generator to provide the modular arithmetic code, and the first modular arithmetic code decoder 42 comprises a second divider 11c1 configured for a division of the operated modular arithmetic code by the generator to determine a first quotient and a first residue, an error position determiner 11c2 configured for a reference to a stored syndrome table to determine a first error bit position from the first residue, and an error bit corrector 11c3 configured for a correction of an error bit of the first quotient corresponding to the first error bit position to provide the first corrected numeric data. The arithmetic operator 14a comprises an arithmetic operation processor 14a1 configured for an arithmetic operation process of the modular arithmetic code to provide a processed modular arithmetic code, and a modular arithmetic code error corrector 14a2 configured for combination of a division of the processed modular arithmetic code to determine a second quotient and a second residue, for a reference to a stored syndrome table to determine a second error bit position from the second residue, for a correction of an error bit of the second quotient corresponding to the second error bit position to provide a second corrected numeric data, and for a multiplication of the second corrected numeric data by the generator, followed by a division by the modulus, to provide the operated modular arithmetic code.

Further, in a sense, an industrial controller comprises an arithmetic operator 14a configured for an arithmetic operation of a numeric data encoded as a modular arithmetic code, a logical operator 12a configured for a logical operation of logical data, a memory section 21 configured for storage of a control program and a set of operation parameters to be stored in advance, an I/O interface 40 configured to input numeric data and logical data, and output numeric data after the numeric operation and logical data after the logical operation, a central controller 13a configured to output prescribed commands to the arithmetic operator and the logical operator for execution of the control program with discrimination of logical data and modular arithmetic coded numeric data, and a bus 30 configured for interconnections therebetween, the I/O interface 40 comprises a modular arithmetic coding encoder 41 configured to encode numeric data included in data input, a first modular arithmetic code decoder 42 configured for combination of a decoding of a numeric data included in data output, a determination of presence or absence of a bit error, and a correction of a detected bit error, if detected any, to output a decoded numeric data, and the memory section 21 comprises a memory 21b configured to store therein as a modular arithmetic code a respective numeric data to be operation processed within the industrial controller, and a second modular arithmetic code decoder 21a configured to provide in a decoded form a coded address data designated by the central controller, whereby a respective one of numeric data encoded at the I/O interface 40 and residing in the industrial controller is allowed to be processed as a modular arithmetic code, and decoded at the I/O interface 40, to be output with a bit error corrected, if any. The modular arithmetic coding encoder 41 comprises a multiplier 11$a$1 configured for a multiplication of the numeric data included in the data input by a predetermined generator of a binary cyclic AN code, and a first divider 11$a$2 configured for a division of an output of the multiplication by a predetermined modulus corresponding to the generator of the binary cyclic AN code, and the first modular arithmetic code decoder 42 comprises a second divider 11$c$1 configured for a division of the numeric data included in the data output by the generator to determine a first quotient and a first residue as a syndrome, an error position determiner 11$c$2 configured for a reference to a syndrome table stored in advance to determine an error bit position for the first residue detected in an output of the second divider, and an error bit corrector 11$c$3 configured to correct an error bit of the first quotient corresponding to an error bit position output of the error position determiner, for an output as a numeric data. The arithmetic operator 14$a$ comprises an arithmetic operation processor 14$a$1 configured for an arithmetic operation process of the numeric data encoded as a modular arithmetic code at the I/O interface, as an input operand, and a modular arithmetic code error corrector 14$a$2 configured for combination of a division of an output of the arithmetic operation processor to determine a second quotient and a second residue as a syndrome, for a reference to a stored syndrome table to determine an error bit position for detection of the second residue, for a correction of an error bit of the second quotient, and for a multiplication of a corrected numeric data by the generator, followed by a division by the modulus, to output a numeric data decoded into a modular arithmetic code.

The present invention is no way limited to the embodiments described, and is applicable to any system, so long as an operator is provided for operation of numeric data, allowing correction of bit errors at the operator, and can be implemented in a variety of modifications within a scope of claims.

This application is based upon the Japanese Patent Application No. 2007-125065, filed on May 9, 2007, the entire content of which is incorporated herein by reference.

What is claimed is:

1. An industrial controller comprising:
    a memory configured to store therein a control program for the industrial controller and control parameters including parameters of a modular arithmetic coding and parameters of an arithmetic operation as a given numerical data;
    an input interface configured to have a numeric data input;
    an arithmetic operator comprising: a modular arithmetic coding encoder configured for the modular arithmetic coding to encode the input numeric data and the given numerical data into a modular arithmetic code; an arithmetic operation processor configured for a process of applying the arithmetic operation to the modular arithmetic code to provide a processed modular arithmetic code; and a modular arithmetic code decoder configured to detect in real time a bit error from the processed modular arithmetic code, and correct in real time the detected bit error to provide a corrected numeric data;
    an output interface configured to output the corrected numeric data; and
    a central controller configured to have the arithmetic operator execute the arithmetic operation based on the control program using the control parameters.

2. The industrial controller as claimed in claim 1, wherein the modular arithmetic coding encoder comprises: a multiplier configured for a multiplication of the input numeric data by a predetermined generator of a binary cyclic AN code to provide a multiplied numeric data; and a first divider configured for a division of the multiplied numeric data by a predetermined modulus corresponding to the generator to provide the modular arithmetic code, and
    the modular arithmetic code decoder comprises: a second divider configured for a division of the processed modular arithmetic code by the generator to determine a quotient and a residue; an error position determiner configured for a reference to a stored syndrome table to determine an error bit position from the residue; and an error bit corrector configured for a correction of an error bit of the quotient corresponding to the error bit position to provide the corrected numeric data.

3. An industrial controller comprising:
    a memory section configured to store therein a control program for the industrial controller and control parameters including parameters of a modular arithmetic coding and parameters of an arithmetic operation as a given numerical data;
    an input interface comprising a modular arithmetic coding encoder configured for the modular arithmetic coding to encode an input numeric data into a first modular arithmetic code;
    an arithmetic operator configured for the arithmetic operation of the first modular arithmetic code and a second modular arithmetic code into which the given numerical data is encoded to provide an operated modular arithmetic code;
    an output interface comprising a first modular arithmetic code decoder configured to detect in real time a bit error from the operated modular arithmetic code, and correct in real time the detected bit error to provide a first corrected numeric data; and
    a central controller configured to have the arithmetic operator execute the arithmetic operation based on the control program using the control parameters, wherein
    the memory section comprises: a second modular arithmetic code decoder configured to decode a modular arithmetic code of an address data designated by the central controller; and a memory configured to store therein a modular arithmetic code of the control parameters.

4. The industrial controller as claimed in claim 3, wherein the modular arithmetic coding encoder comprises: a multiplier configured for a multiplication of the input numeric data by a predetermined generator of a binary cyclic AN code to provide a multiplied numeric data; and a first divider configured for a division of the multiplied numeric data by a predetermined modulus corresponding to the generator to provide the modular arithmetic code, and
    the first modular arithmetic code decoder comprises: a second divider configured for a division of the operated modular arithmetic code by the generator to determine a first quotient and a first residue; an error position determiner configured for a reference to a stored syndrome table to determine a first error bit position from the first residue; and an error bit corrector configured for a correction of an error bit of the first quotient corresponding to the first error bit position to provide the first corrected numeric data.

5. The industrial controller as claimed in claim 4, wherein the arithmetic operator comprises: an arithmetic operation processor configured for an arithmetic operation process of the modular arithmetic code to provide a processed modular arithmetic code; and a modular arithmetic code error corrector configured for combination of a division of the processed modular arithmetic code to determine a second quotient and a second residue, for a reference to a stored syndrome table to determine a second error bit position from the second residue, for a correction of an error bit of the second quotient corresponding to the second error bit position to provide a second corrected numeric data, and for a multiplication of the second corrected numeric data by the generator, followed by a division by the modulus, to provide the operated modular arithmetic code.

\* \* \* \* \*